Feb. 13, 1962   R. A. AMMON   3,021,505
ELECTRICAL INDICATING INSTRUMENT
Filed Oct. 2, 1956   2 Sheets-Sheet 1
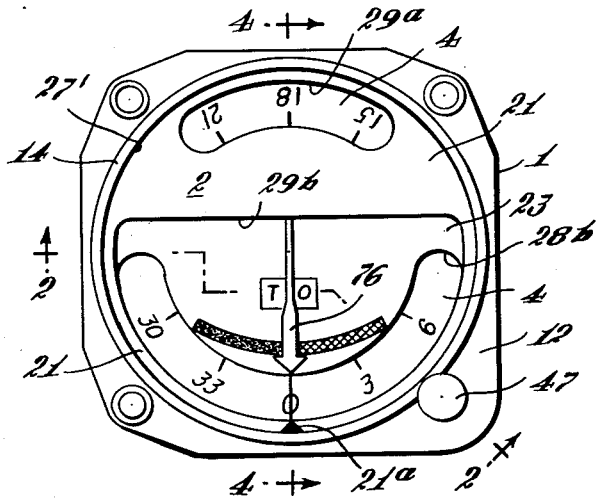
Fig. 1
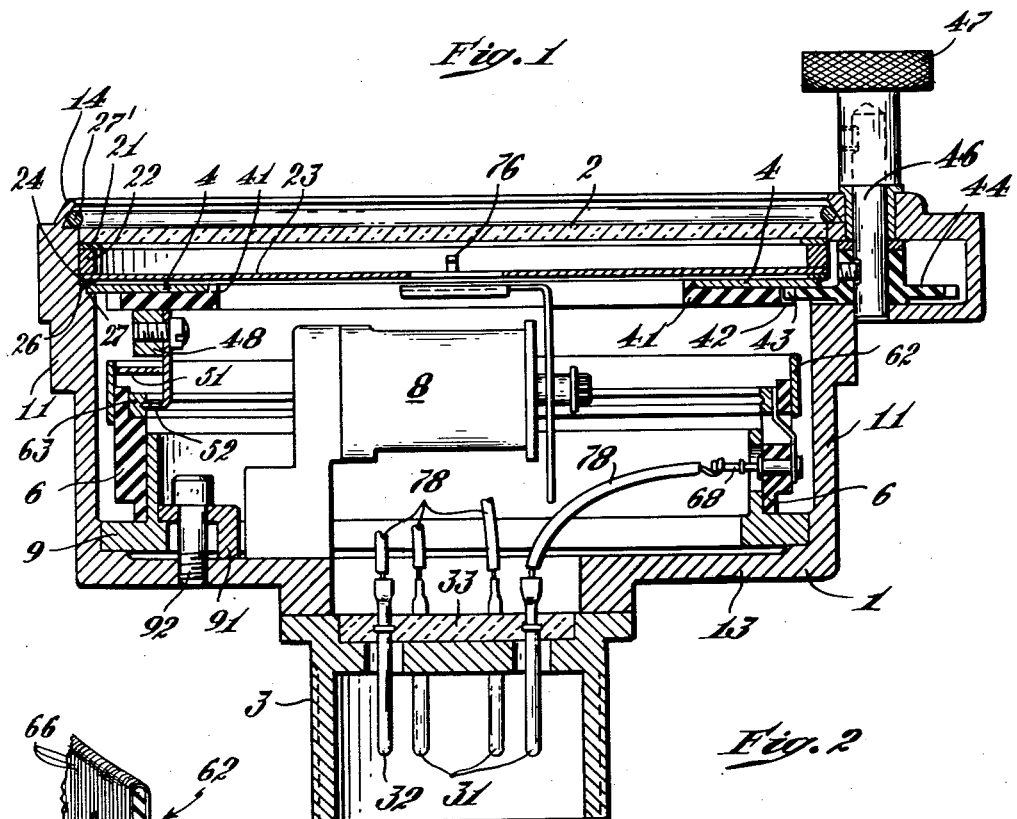
Fig. 2
Fig. 3
Inventor
Roscoe A. Ammon
by Roberts, Cushman & Grover
Att'ys

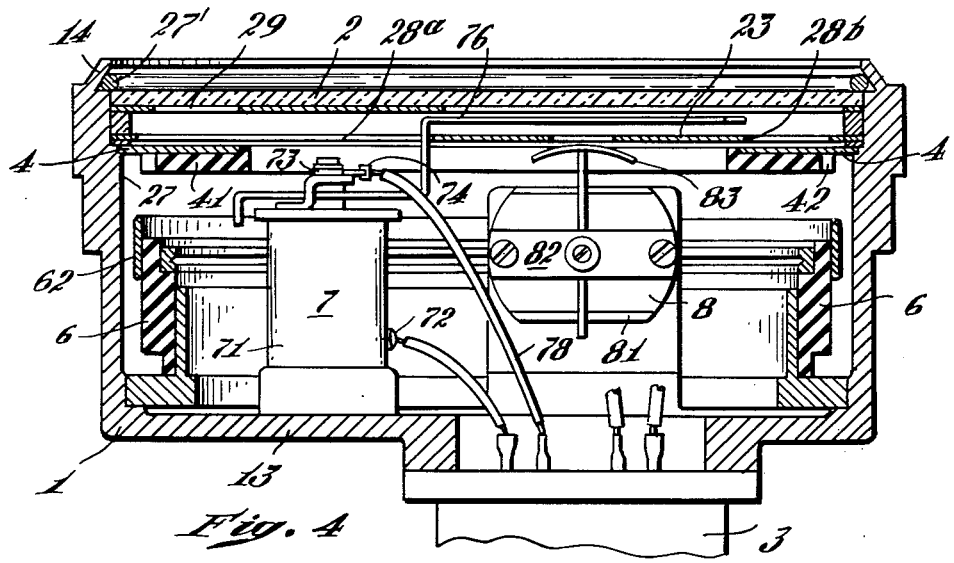
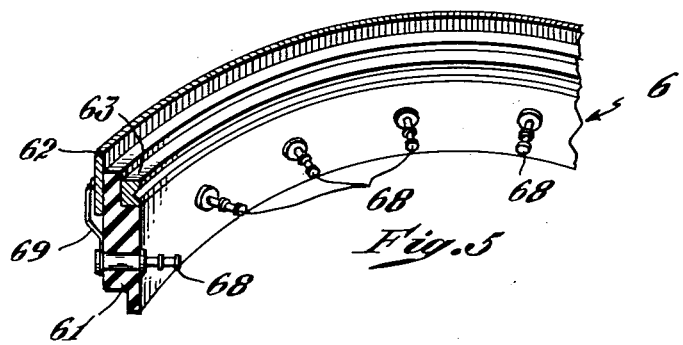
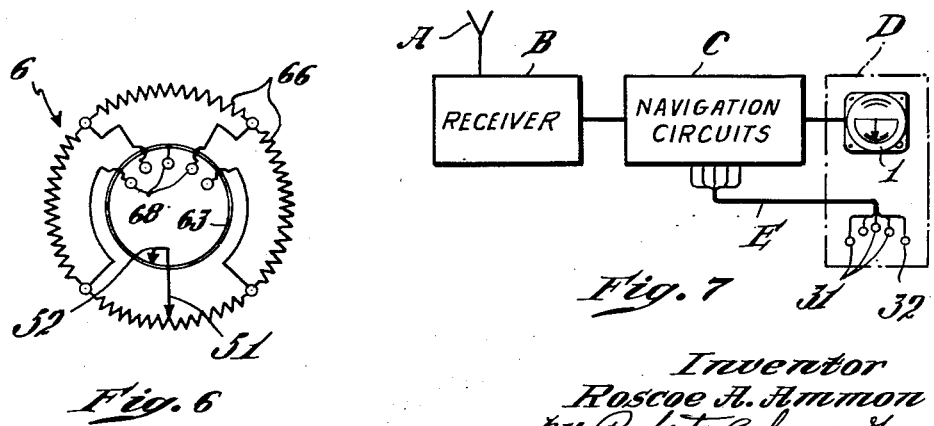

United States Patent Office 3,021,505
Patented Feb. 13, 1962

3,021,505
ELECTRICAL INDICATING INSTRUMENT
Roscoe A. Ammon, Manchester, N.H., assignor, by mesne assignments, to Minneapolis-Honeywell Regulator Company, a corporation of Delaware
Filed Oct. 2, 1956, Ser. No. 613,558
11 Claims. (Cl. 340—27)

This invention relates to instruments for indicating electrical voltages or values and particularly to a navigation instrument for selecting a radio course and indicating deviations from the course.

One exemplary type of instrument is used in the omnirange aircraft navigation system described in the Civil Aeronautics Administration Airways Operations Training Bulletin No. 3. In this system a ground station transmits radial signals which are distinctive for the different radii from the station. Receiving equipment on the aircraft derives a voltage corresponding to the distinctive signal on a radius, compares it with a voltage which corresponds to a desired radial approach course selected by the pilot, and, by comparison of the received and selected voltages, produces a voltage indicative of any deviation of the aircraft from the selected course. A panel instrument which is the subject of the present invention indicates the desired course and whether there is a deviation from that course. In the navigation system described, the voltage corresponding to the course is selected by a variable resistance, which voltage is compared with the received signal voltage by a navigation circuit external of the instrument, and the resultant deviation voltage applied to a moving coil mechanism for indicating deviation. However, it will be understood that in other systems, such as computers, various impedances may be used to select a value for comparison with an external value and for indication of the difference between the values.

According to the present invention the instrument comprises a case having a window at one end, annular plate means mounted within the case so as to rotate about an axis extending through the case and carrying indicia, such as numerals, visible through the window, means extending exteriorly of the case and engaging the aforesaid plate means at a location spaced from the said axis for rotating the plate means about the axis, impedance means extending in curved form concentric with the axis, and a wiper or like pickup member carried by the plate means for adjustable interaction at points or positions around the impedance. Preferably the instrument also includes a mechanism extending through the annular plate means and the impedance for indicating the relation between the position of interaction and an external value. A wiper may be used as a pickup for a resistance, or a coil or plate respectively may be used if the impedance is an inductance or capacitor.

For the purpose of illustration a typical embodiment of the invention is shown in the accompanying drawings in which FIG. 1 is a front view of a navigation instrument;
FIG. 2 is a section on line 2—2 of FIG. 1;
FIG. 3 is a fragmentary section showing a detail of an annular resistance;
FIG. 4 is a section on line 4—4 of FIG. 1;
FIG. 5 is an isometric view, partly in section, showing further details of the annular resistance and its mount;
FIG. 6 is a schematic view of the resistance; and
FIG. 7 is a diagram showing the relation of the instrument to radio receiving and navigation apparatus.

As shown in the figures the instrument comprises a casing 1 having a cylindrical side wall 11 having a front flange 12, a window 2, and a rear wall 13 in which is mounted a standard connector coupling 3. Within the case 1 are mounted a rotatable azimuth dial plate 4, a resistance card 6, and moving coil mechanisms 7 and 8.

The window 2, an outer masking dial plate 21, a spacing ring 22, an inner masking dial plate 23 and a locking ring 24 are stacked on a seat formed at the open end of the casing 1 by the side wall 11 and a shoulder by means of a ring 27' which is snapped in place within a bead 14 integral with the case. The azimuth plate 4 comprises an annulus carrying the numbers 0 to 33 at three digit intervals throughout 360°. The radial width of the azimuth plate 4 is sufficient to provide space for the numbers which are visible through two openings 28a and 28b in the inner masking dial 23 and openings 29a and 29b in the outer dial 21. The azimuth dial plate 4 is loosely held on a shoulder 27 of the casing side wall 11 by the locking ring 24 so as to permit the azimuth dial plate to rotate throughout 360° or further.

The dial plate 4 carries a ring 41 of insulating material, the outer periphery of which is provided with teeth 42. The teeth 42 of the ring are meshed with teeth 43 carried on a gear 44 secured to a shaft 46 which may be turned by an external knob 47, whereby the azimuth dial 4 may be rotated by turning the external knob 47. Depending from the insulated, toothed ring 41 is a mounting block 48 to which is secured a metallic conducting contact member including a wiper 51 and a contact finger 52 which engage the resistance card 6.

As shown in FIGS. 3, 5 and 6 the resistance card 6 comprises a complete ring of insulating material 61 carrying a resistance ring 62 and a metal conducting ring 63. As shown enlarged in FIG. 3, the resistance ring 62 comprises an annular card 64 on which fine turns of wire 66 are wound. The resistance ring 62 is cemented to the outside of the insulating ring 61 while the conducting ring 63 is press fitted on the shoulder 67 of the insulating ring. Staked in the insulating ring are five terminals 68 which extend from the outer to the inner side of the ring. As shown in FIGS. 5 and 6, four of the terminals 68 are connected by leads 69 to the resistance turns 66 at points electrically 90° apart thereby dividing the resistance ring into four equal parts. As shown in FIG. 2, the fifth terminal 68 is connected to the conducting ring 63. On the contact member the wiper 51 and finger 52 are electrically connected so that the point at which the wiper 51 contacts the resistance 66 is electrically connected to the fifth terminal.

As shown in FIGS. 4 and 5 the finger 52 is held in a groove 65, the contact member 51—52 being slightly biased yieldingly to urge the finger into the groove and thereby hold the finger 51 in engagement with the turns 66 of the resistance ring 62, and so that the groove 65 in the conducting ring 63 guides and controls the spring pressure of the contact member without placing undue pressure on the resistance ring 62.

The resistance card assembly 6 is positioned in the case 1 by a collar 9 which is clamped against the rear wall 13 of the casing 1 by a member 91 and a machine screw 92. The collar 9 and clamping member 91, as well as the resistance card 6 and the azimuth dial 4, are located adjacent the side wall 11 and are in annular form with wide axial openings which leave the center space of the casing unobstructed.

This arrangement permits mounting of moving coil mechanisms 7 and 8 in the central space of the meter case 1. The first mechanism 7 comprises a moving coil instrument having a field assembly 71 carrying a first terminal 72, a bridge portion 73 having a second terminal 74 and a pointer 76. The pointer 76 extends through the axial opening of the azimuth dial 4, the opening 28a in the fixed inner dial 23 to a plane between the inner outer dial 21. Lead wires 78 are connected between the terminals 72 and 74 of the mechanism 7 and the terminal 68 of the resistance card 6 to input and output terminals 31 and 32 fused in a glass bead 33 which is set in the terminal housing 3.

The second mechanism 8 comprises a moving coil instrument with a field assembly 81, a bridge 82 and a signal flag 83 extending through the axial opening of the azimuth dial to a window in the inner dial 23.

Although this invention is concerned primarily with the instrument itself, the application of the instrument is shown diagrammatically in FIG. 7 in which is shown an aircraft navigation system comprising an antenna A, a conventional receiver B, navigation circuits C and the instrument D which is the subject of the present invention. The external receiving and navigating circuits detect a signal radiating from a fixed station and derive a voltage dependent on the direction of the aircraft from the station. The navigation circuits also apply a D.C. voltage to the resistance ring 6 through input terminals 31 as indicated by a cable E in FIG. 7. The navigator of the aircraft selects a desired course toward the transmitting station by turning the knob 47 until a numeral designating the course is brought opposite a fixed index 21, thereby selecting a voltage from the resistance 66 with the wiper 51. The voltage carried by the conducting ring 63 and one of the output terminals 31 will then correspond to a selected position of the azimuth dial 4 and its indicia. This selected voltage is applied to the navigation circuit and compared with the voltage value of the received signal. The resultant voltage, which is dependent upon the relation between the voltage derived from the external signal and the selected voltage, is applied through input terminal 31 to the indicating mechanism 7. So long as there is a difference between the external voltage and the selected voltage, the pointer 76 of the mechanism 7 wil swing from the normal or null position shown in FIG. 1 and thus indicate a deviation of the aircraft from the selected course to or from the transmitting station. Other navigation circuits cause the signal flag 83 of the second mechanism 8 to indicate whether the course is to or from the transmitting stations. By rotating the azimuth dial 4 until the pointer 76 is nulled, the navigator can determine on what radial course he is flying. Or, by navigating the aircraft until the meter is nulled he can bring the craft onto the selected course.

I claim:

1. An indicating instrument comprising a case having an internal cylindrical wall and a window at one end, annular dial plate means mounted within said case to rotate about an axis through the case and carrying indicia visible through said window, said dial plate means being supported at its periphery on said wall, means extending exteriorly of the case and engaging the plate means at a location spaced from said axis for rotating the plate means, resistance means extending in curved form concentric with said axis and close to said wall, a wiper carried by and extending directly from a peripheral portion of said plate means and protruding in a direction inwardly and away from the window end of said case, said wiper being further positioned to slidingly engage said resistance and said opening formed by the inside diameter of said annular dial plate providing a space for accommodating an electrical meter positioned therein.

2. An indicating instrument comprising a case having an internal cylindrical wall and a window at one end, annular dial plate means mounted within said case to rotate about an axis through the case and carrying indicia visible through said window, said dial plate means being supported at its periphery on said wall, means extending exteriorly of the case and engaging the annular dial plate means at a location spaced from said axis for rotating the plate means, annular resistance means concentric with said axis and close to said wall, said plate means and annular resistance having unobstructed openings therethrough, a wiper carried by and extending directly from a peripheral portion of said plate means and protruding in a direction inwardly and away from the window end of said case, said wiper being further positioned to slidingly engage said resistance at a point, and a mechanism extending through the openings formed by the inside diameters of said annular plate means and resistance for indicating the relation of said resistance points to an external value.

3. An indicating instrument comprising a case having an internal cylindrical wall and a window at one end, annular dial plate means mounted within said case to rotate about an axis through the case and carrying indicia visible through said window, said dial plate means being supported at its periphery on said wall, means extending exteriorly of the case and engaging the annular dial plate means at a location spaced from said axis for rotating the plate means and indicia to a selected position relative to the case, resistance means extending in curved form concentric with said axis and close to said wall, a wiper carried by and extending directly from a peripheral portion of said plate means and protruding in a direction inwardly and away from the window end of said case, said wiper being further positioned to slidingly engage said resistance at a point corresponding to the position of said indicia, and an electrical meter mechanism mounted in the case and extending through the openings formed by the inside diameters of said annular dial plate means including a member visible through said window for indicating the relation between the selected position of said indicia and an external value.

4. An indicating instrument comprising a case having an internal cylindrical wall and a window at one end, an idex fixed within the case at said end, annular plate means mounted within said case to rotate about an axis through the case and carrying indicia visible through said window, said dial plate means being supported at its periphery on said wall, means extending exteriorly of the case and engaging the annular dial plate means at a location spaced from said axis for rotating the plate means to bring a selected indicium opposite said index, resistance means extending in curved form concentric with said axis and close to said wall, a wiper carried by and extending directly from a peripheral portion of said plate means and protruding in a direction inwardly and away from the window end of said case, said wiper being further positioned to slidingly engage said resistance at a point corresponding to said selected indicium, and a mechanism mounted in said case to extend through the opening formed by the inside diameter of said resistance and annular plate means including a member visible through said window for indicating the relation between an external value and said selected indicium.

5. In combination with an external circuit for comparing a signal voltage with a preselected voltage to produce a resultant voltage, an electrical instrument for indicating the relation of said preselected voltage to the signal voltage of said external circuit, comprising a case having an internal cylindrical wall and a window at one end, annular dial plate means mounted within said case to rotate about an axis through the case and carrying indicia visible through said window, said dial plate means being supported at its periphery on said wall, means extending exteriorly of the case and engaging the annular dial plate means at a location spaced from said axis for rotating the plate means and indicia to a selected position relative to the case, resistance means extending in curved form concentric with said axis and close to said wall, a wiper carried by and extending directly from a peripheral portion of said plate means and protruding in a direction inwardly and away from the window end of said case, said wiper being further positioned to slidingly engage said resistance at a voltage point corresponding to the selected position of said indicia, output means for applying the selected voltage at said point to the external comparison circuit, an electrical mechanism mounted in said case and extending through an opening formed by the inside diameter of said annular dial plate means including a member visible through said window for indicating the relation between said voltages, and input means for connecting the external circuit to said mechanism, thereby to apply the resultant voltage to said mechanism.

6. An indicating instrument comprising a case having an internal cylindrical wall and a window at one end, annular dial plate means mounted within said case to rotate about an axis through the case and carrying indicia visible through said window, said dial plate means being supported at its periphery on said wall, means extending exteriorly of the case and engaging the annular dial plate means at a location spaced from said axis for rotating the plate means, an annular insulation card mounted within the case concentric with said axis and close to said wall, a resistance ring carried by the card, a wiper carried by and extending directly from a peripheral portion of said plate means and protruding in a direction inwardly and away from the window end of said case, said wiper being further positioned to slidingly engage said resistance ring and said opening formed by the inside diameter of said annular dial plate providing a space for accommodating a moving coil mechanism positioned therein.

7. An indicating instrument comprising a case having an internal cylindrical wall and a window at one end thereof, annular dial plate means mounted within said case to rotate about an axis through the case and carrying indicia visible through said window, said dial plate means being supported at its periphery on said wall, means extending exteriorly of the case and engaging the annular dial plate means at a location spaced from said axis for rotating the plate means, an annular insulation card mounted within the case concentric with said axis and close to said wall, a resistance ring and a metal ring carried by the card in insulated relation thereto, a wiper carried by and extending directly from a peripheral portion of said annular dial plate means and protruding in a direction inwardly and away from the window end of said case, said wiper being further positioned to slidingly engage said resistance, a finger connected to said wiper and carried therewith in engagement with said ring, and output terminals connected to said rings respectively and said opening formed by the inside diameter of said annular dial plate providing a space for accommodating a moving coil mechanism positioned therein.

8. An indicating instrument comprising a case having an internal cylindrical wall and a window at one end, an annular navigational course indicating dial plate means operably mounted to rotate on an inner peripheral portion of said case, said annular dial plate carrying indicia thereon that are visible through said window, said dial plate means being supported at its periphery on said wall, means positioned within the other end of said case extending exteriorly of said one end of the case and engaging the peripheral surface of the dial plate means at a position that is at a fixed radial distance from said axis passing through said case for rotating said annular dial plate means, impedance means extending in curved form concentric with said axis and close to said wall, pick-up means carried by and extending directly from a peripheral underside portion of said dial plate means which faces the other end of the case for adjustable inter-action with the impedance means at various positions and said opening formed by the inside diameter of said annular dial plate means providing a space for accommodating an electrical meter positioned therein.

9. An indicating instrument comprising a case having an internal cylindrical wall and a window at one end thereof, an annular dial plate means positioned within said case and mounted to rotate on a circumferential portion of said cylindrical wall that forms an inner peripheral recess therein and carrying indicia through said window, means extending exteriorly of the case and engaging the annular dial plate means at a location spaced from the central axis of said cylindrical wall for rotating the annular dial plate means, an annular insulation card mounted within the case and being positioned concentric with said axis and close to said cylindrical wall, a resistance ring and a metal ring carried respectively by outer and inner peripheral surfaces of the card and each being in insulated relation thereto, a wiper and a finger carried by a portion of said annular dial plate means and extending directly away from a peripheral portion thereof and respectively slidingly engaging said resistance ring and metal ring, said metal ring forming an annular guide means to engage said finger and hold said wiper in engagement with said resistance ring without placing undue pressure on said last-mentioned ring, output terminals connected to said rings respectively and said opening formed by the inside diameter of said annular dial plate providing a space for accommodating a moving coil mechanism positioned therein.

10. An indicating instrument comprising a case having a wall of a hollow cylindrical configuration, a wiper connected at one end to an inner peripheral portion of an annular member that is positioned for rotation on an inner recess portion of said cylindrical wall, a finger fixedly connected to an opposite end portion of the wiper, an annular insulation card mounted in the case and being positioned immediately adjacent said wall, a resistance ring and a metal ring carried on the card, said wiper having its opposite end portion slidingly engaging the resistance ring and said finger portion slidingly engaging the metal ring to hold the wiper in engagement with said resistance ring and said opening formed by the inside diameter of said annular plate providing a space for accommodating a moving coil mechanism positioned therein.

11. An indicating instrument comprising a case having a side wall of a hollow cylindrical configuration, a wiper connected to an inner peripheral portion of an annular member that is positioned for rotation on an inner recessed portion of said side wall, said wiper having a contact finger portion protruding outwardly therefrom, an annular insulation ring mounted immediately adjacent the inner surface of the case, an annular resistance ring and an annular metal ring carried respectively by an inner and outer annular surface of the insulation ring, said wiper being positioned to slidingly engage the resistance ring and the finger portion being positioned to slidably engage the annular metal ring to hold the wiper in engagement with said resistance ring, terminals mounted to extend through the side wall of said annular insulation ring; and certain ones of said terminals being connected to said resistance ring while a remaining one of said terminals is connected to said annular metal ring and said space formed by said inside diameter of said annular member and said annular insulation ring providing a space for accommodating an electrical meter positioned therein.

References Cited in the file of this patent

UNITED STATES PATENTS

| | | |
|---|---|---|
| 2,551,989 | Wilson | May 8, 1951 |
| 2,615,065 | Farnham | Oct. 21, 1952 |
| 2,677,120 | Konet | Apr. 27, 1954 |
| 2,694,127 | Fearn | Nov. 9, 1954 |
| 2,778,004 | Lear | Jan. 15, 1957 |
| 2,778,906 | Burgess | Jan. 22, 1957 |
| 2,803,799 | Siegel | Aug. 20, 1957 |
| 2,827,621 | Reichert | Mar. 18, 1958 |
| 2,875,431 | De Giers | Feb. 24, 1959 |